United States Patent [19]

Nakagome et al.

[11] 4,057,834

[45] Nov. 8, 1977

[54] SIGNAL COMPRESSION SYSTEM FOR BINARY DIGITAL SIGNALS

[75] Inventors: Yukio Nakagome, Yokohama; Hiroichi Teramura, Tokyo; Yasuo Fukata, Mitaka; Yasuhiro Yamasaki, Machida, all of Japan

[73] Assignee: Kokusai Denshin Denwa Kabushiki Kaisha, Japan

[21] Appl. No.: 597,403

[22] Filed: July 18, 1975

Related U.S. Application Data

[63] Continuation-in-part of Ser. No. 459,848, April 10, 1974, abandoned.

[30] Foreign Application Priority Data

Apr. 12, 1974 Japan .................................. 49-40831
July 25, 1973 Japan .................................. 48-83071

[51] Int. Cl.² ............................................... H04N 7/12
[52] U.S. Cl. ..................... 358/133; 358/260; 358/261
[58] Field of Search ......... 340/347 DD; 178/DIG. 3; 358/133, 260, 261

[56] References Cited

U.S. PATENT DOCUMENTS

| 2,978,535 | 4/1961 | Brown | 178/DIG. 3 |
| 3,061,672 | 10/1962 | Wyle | 178/DIG. 3 |
| 3,071,727 | 1/1963 | Kitsopoulos | 178/DIG. 3 |
| 3,483,317 | 12/1969 | De Groat | 178/DIG. 3 |
| 3,754,238 | 8/1973 | Oswald | 178/DIG. 3 |
| 3,783,187 | 1/1974 | Kusama et al. | 178/DIG. 3 |
| 3,935,379 | 1/1976 | Thornburg et al. | 178/DIG. 3 |
| 3,941,922 | 3/1976 | Tsuchiya et al. | 178/DIG. 3 |

Primary Examiner—Thomas J. Sloyan
Attorney, Agent, or Firm—Robert E. Burns; Emmanuel J. Lobato; Bruce L. Adams

[57] ABSTRACT

A signal compression system for efficient transmission of an input binary digital signal, in the form of a binary pulse signal, in which bit polarity reversal is checked after sampling for a predetermined number of bits of the sampled binary pulse signal. In a case of detection of any bit polarity reversal, the sampled binary pulse signal is sent out into a converted output pulse signal for the predetermined number of bits. In a case of non-detection of any polarity reversal, the number of bits or the number of bit blocks having no polarity reversal is coded as a coded pulse signal and sent out into the converted output pulse signal. A coded pulse signal is distinguished, in the converted output pulse signal, from the binary pulse signal by at least one flag bit.

3 Claims, 7 Drawing Figures

SIGNAL COMPRESSION SYSTEM FOR BINARY DIGITAL SIGNALS

CROSS-REFERENCE TO RELATED APPLICATIONS

This application is a continuation-in-part of our co-pending application of Ser. No. 459,848 filed on Apr. 10, 1974 and now abandoned.

FIELD OF THE INVENTION

This invention relates to a signal conversion system for efficient transmission of a binary digital signal.

BRIEF DESCRIPTION OF THE PRIOR ART

Binary digital signals to be transmitted have a signal configuration that is considered as a multiple of a unit signal element length, as in telegraphy or in data transmission, etc., and a signal configuration in which time lengths of "white" and "black" picture elements have analog arbitrary values, as in facsimile. As transmission systems, it is desirable to transmit the both configurations of signals.

For this kind of transmission in the prior art, use is made of any one of a system 1 which transmits a received binary digital signal as it is; a system 2 which samples a received binary digital signal at a certain sampling period and transmits it as a digital signal without band width compression; and a system 3 which samples a received binary digital signal and transmits it, after coding a time period between a transition instant and an immediately succeeding transition instant. In the case of the systems 1 and 2, the transmission band is prepared in consideration of relatively dense distribution of transition instants, so that if transition instants are sparse, an unnecessary band width is and uneconomically occupied. Further in the case of the system 3, the time period is transmitted in a binary coded form, so that in the case of a digital signal of the same polarity having a relatively long duration, the band width is compressed with respect to the product of band width and time. However, if the signal duration of the same polarity is short, for example, in a case where the polarity of a binary signal is inverted at every sampling time, the band width is inevitably expanded.

BRIEF SUMMARY OF THE INVENTION

An object of this invention is to provide a signal conversion system of a binary digital signal which enables compression of a required band width with respect to the product of band width and time regardless of the density of zero-level crossing points or polarity transmition instants.

In the present invention, a binary sampled signal obtained by sampling an input binary digital signal is divided into blocks each corresponding to a certain number of bits. If at least one bit change or polarity reversal exists in the block, information of that block is added with a flag bit and then transmitted without coding. If blocks having no bit change or polarity reversal continue, the blocks are not transmitted but the number of those blocks is counted so that the counted value is added with a flag bit and then transmitted before a block having any polarity reversal is transmitted, thus providing band width compression regardless of the density of polarity transition instants.

The flag bit may be added directly to bits indicative of the counted value but the flag bit may also be added after at least one redundant bit is added to the bits indicative of the counted value to adjust the latter to a constant length of the block. In the following, descriptions will be given of this invention mainly with regard to the case where the bits indicative of the counted value are adjusted to the constant length of the block.

BRIEF DESCRIPTION OF THE DRAWINGS

The principle, construction and operation of the invention will be clearly understood from the following detailed description taken in conjunction with the accompanying drawings, in which.

DETAILED DESCRIPTION OF THE INVENTION

Figure 1:
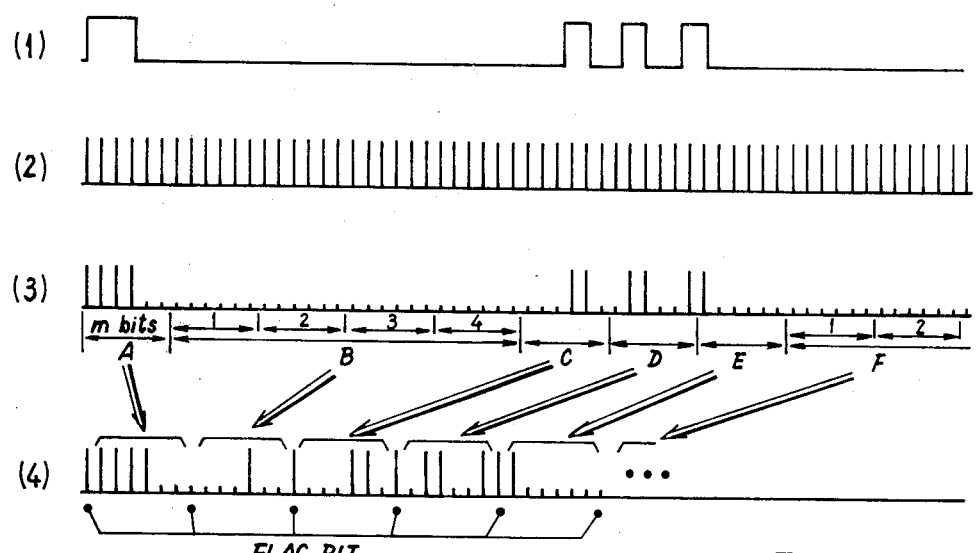
FIG. 1 illustrates time charts explanatory of the principle of an example of this invention.

With reference to FIG. 1, the principle of this invention will first be described. In FIG. 1, trains 1, 2, 3 and 4 illustrate an input binary signal, a sampling pulse train, a sampled input pulse train and a converted output pulse train, respectively. In accordance with the principle of this invention, the sampled input pulse train 3 is divided for every block of $m$ bits. The polarity of each of the bits of each block are compared with a last bit of the respective immediately preceding blocks. If at least one bit of the compared block changes in polarity in comparison with the polarity of the last bit of the immediately preceding block, the compared block having at least one bit polarity reversal (hereinafter referred to "reversal or bit change polarity block") is sent out without coding together with a flag bit "1." In FIG. 1, blocks A, C, D and E are reversal polarity blocks. If there is no bit polarity in the compared $m$ bits, the number of those blocks having no bit polarity reversals (hereinafter referred to "same polarity block") is counted until the occurrence of a next reversal polarity block, so that the counted number of the same polarity blocks is coded and sent out together with a flag bit "0." In FIG. 1, block B is such a same polarity block and the counted number "four" is coded.

Figure 2:
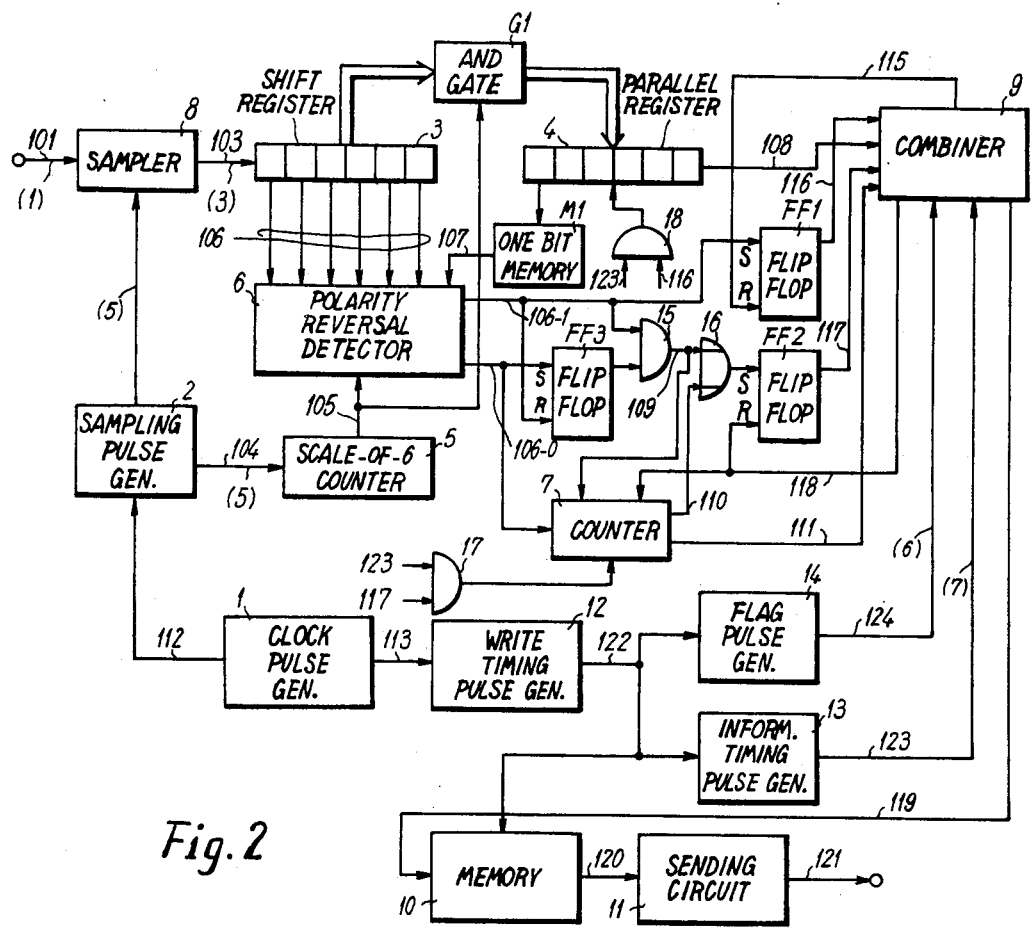
FIG. 2 is a block diagram illustrating an embodiment of the invention employed for performing the principle shown in FIG. 1.

With reference to FIG. 2, an embodiment of this invention comprises a clock pulse generator 1, a sampling pulse generator 2, a shift register 3, a parallel register 4, flip-flop circuits FF1 to FF3, an AND gate G1, a scale-of-6 counter 5 for counting the number of sampling pulses, a polarity reversal detector 6 for detecting at least one bit polarity reversal, a counter 7 for counting the number of successive same polarity blocks, 2 sampler 8, a combiner or signal interlacing means 9 for combining the contents of the register 4 with the contents of the counter 7, a memory 10 for temporarily storing the output of the combiner 9, a sending circuit 11 for sending information read out of the memory 10, a write timing pulse generator 12, an information timing pulse generator 13, a flag pulse generator 14, AND circuits 15, 17 and 18, and OR circuit 16, and a one-bit memory M1.

Figure 5:
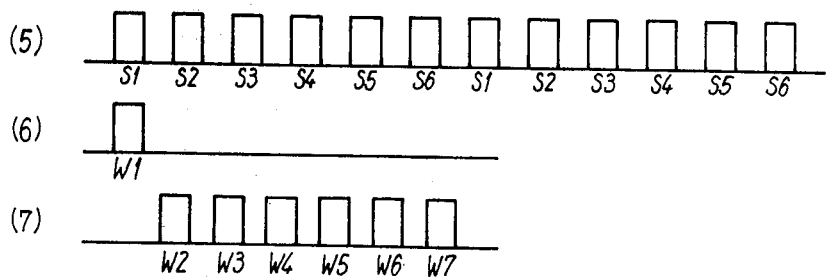
FIG. 5 shows time charts illustrating pulse trains explanatory of the operations of the illustrated block diagrams.

The operation of the embodiment shown in FIG. 2 is as follows. The sampling pulse generator 2 receives through a line 112 clock pulses from the clock pulse generator 1 and counts down to one seventh to produce sampling pulses 5 as shown in FIG. 5. The input binary signal 1 received through a line 101 is sampled at the sampler 8 by the use of the sampling pulses 5 to provide the sampled input pulse train 3, which is applied to the shift register 3. On the other hand, the sampling pulses 5 from the sampling pulse generator 2 are further applied to the scale-of-6 counter 5 through a line 104, so that a carry pulse is applied through a line 105 to the polarity reversal detector 6 and the gate G1 for each six pulses of the sampling pulses 5 to indicate a point of time between adjacent blocks of six bits. The polarity reversal detector 6 compares each of the bits of the shift register 3 with the stored one bit stored in the memory M1 for every occurrence of a carry pulse on the line 105. In this case, if there is at least one bit polarity reversal in the compared bits, an output pulse is generated at a line 106-1 in synchronism with the carry pulse on the line 105. However, if there is no bit polarity reversal in the compared bits, an output pulse is generated at a line 106-0 in synchronism with the carry pulse on the line 105.

Figure 3A:
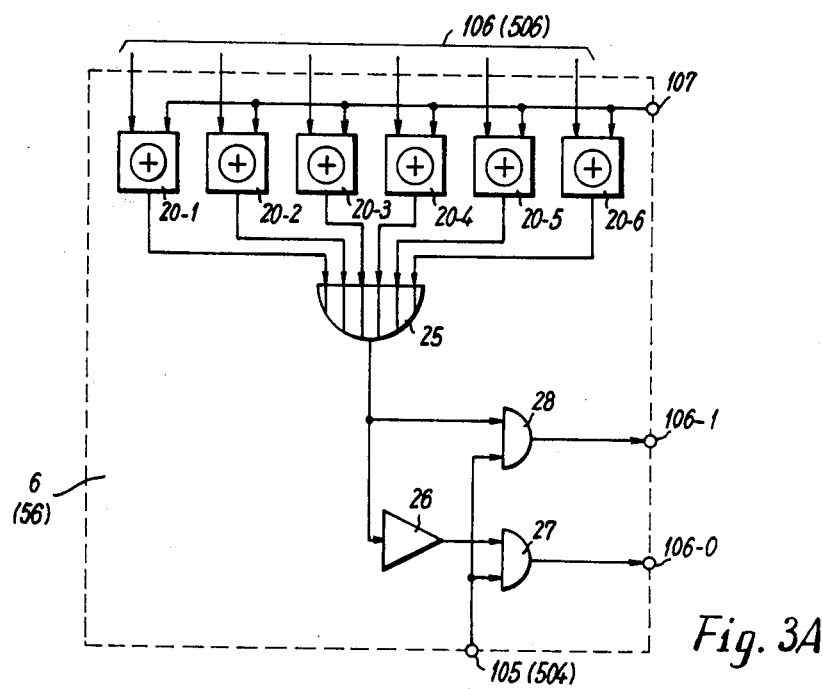
FIG. 3A is a block diagram illustrating an example of a polarity reversal detector employed in this invention.

An example of the polarity reversal detector 6 is shown in FIG. 3A, which comprises exclusive OR circuits 20-1 to 20-6, an OR circuit 25, an inverter 26, and AND circuits 28 and 27. Each bit of the shift register 3 applied through a set of lines 106 is compared with the bit of the memory M1 applied through a line 107 to the exclusive OR circuits 20-1 to 20-6. If there is a bit polarity reversal in the compared bits, an output of the corresponding exclusive OR circuit is applied through the OR circuit 25 to the AND circuit 28, so that an output pulse is obtained at the line 106-1 in synchronism with the carry pulse applied through the line 105. However, if there is no reversal polarity bit in the compared bits, no pulse is generated from the exclusive OR circuit 20-1 to 20-6 and the state "1" is applied from the inverter 26 to the AND circuit 27, so that an output pulse is obtained at the line 106-0 in synchronism with the carry pulse applied through the line 105.

With reference to FIG. 2 again, the gate G1 passes the contents of the shift register 3 to the parallel register 4 at the occurrence of the carry pulse of the line 105. The output pulse on the line 106-1 is applied to the AND circuit 15 and sets the flip flop circuit FF1 but resets the flip flop circuit FF3. The output pulse on the line 106-0 is applied to the counter 7 and sets the flip-flop circuit FF3. The AND circuit 15 performs the logical AND operation on the "1" output of the flip flop circuit FF3 and the pulse of the line 106-1, so that a pulse is provided at the output line 109 of the AND circuit 15 and the end of six bits of the same polarity block to apply it to the counter 7 and further sets the flip flop circuit FF2 through the OR circuit 16. The counter 7 counts pulses applied through the line 106-0 until the pulse is obtained at the line 109. A carry pulse of the counter 7 is obtained at a line 110 and sets the flip flop circuit FF2 through the OR circuit 16. The combiner 9 monitors the states of the flip flop circuits FF1 and FF2. If the flip flop circuit FF1 assumes the state "1," a flag pulse 6 is shown in FIG. 5 and applied through a line 124 is transferred to the memory 10, while the contents of the parallel register 4 are received through a line 108 and transferred at the occurrence of information timing pulses 7 shown in FIG. 5 to the memory 11. When the transferring operation is completed, the flip-flop circuit FF1 is reset through a line 115. The contents of the register 4 are shifted in a parallel bit configuration in synchronism with pulses applied through an AND circuit 18, which is controlled by pulses of the lines 116 and 123. However, if the flip flop circuit FF2 is set to the state "1," the contents of the counter 7 are transferred to the memory 10 through the combiner 9 at the occurrences of the pulses 7 applied through the AND gate 17, which is controlled by pulses of the lines 117 and 123. When the latter transferring operation is completed, the flip flop circuit FF2 is reset through a line 118, while the counter 7 is reset to the state "0."

Figure 3B:
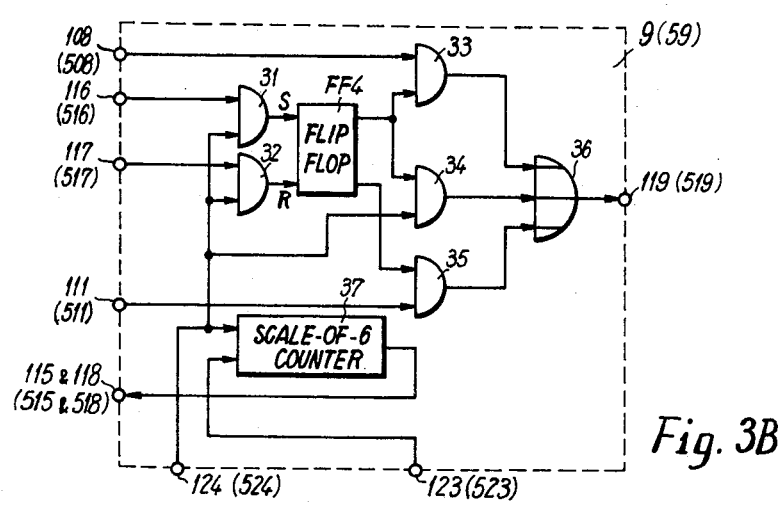
FIG. 3B is a block diagram illustrating an example of a combiner employed in this invention.

An example of the combiner 9 is shown in FIG. 3B, which comprises AND circuits 31, 32, 33, 34 and 35, an OR circuit 36, a scale-of-6 counter 37, and a flip flop circuit FF4. The output "1" of the flip flop circuit FF1 is applied through the line 116, so that an AND output of the state "1" of the line 116 and the flag pulse from the line 124 is obtained from the AND circuit 31 to set the flip flop circuit FF4. When the flip flop circuit 4 is set, the AND circuit 34 is opened to pass therethrough the flag pulse from the line 124 to the OR circuit 36 and the line 119, while the AND circuit 33 is also opened to pass therethrough the contents of the register 4 from the line 108 to the OR circuit 36 and the line 119. If the flip flop circuit 4 is reset, the AND circuit 35 is opened to pass therethrough the contents of the counter 7 from the line 111 to the OR circuit 36 and the line 119. The scale-of-6 counter 37 counts the information timing pulses 7 supplied from the line 124, so that a carry pulse is applied to the lines 115 and the 118 for every six pulses of the information timing pulses 7.

With reference to FIG. 2 again, the write timing pulse generator 12 receives clock pulses from the clock pulses generator 1 through a line 113 and counts down to one sixth to apply the counted down pulses to a line 122. The flag pulse generator 14 generates the flag pulse 6 in response to the write timing pulse from the line 122. The information timing pulse generator 13 receives write timing pulses from the line 122 and generates the information timing pulses 7 to the line 123. The information timing pulses 7 are further applied to the parallel register 4 and the counter 7 through the AND circuits 18 and 17 respectively. The contents of the memory 10 are sent out to a line 121 through the sending circuit at the occurrence of the write timing pulses on the line 122.

As mentioned above, since the number of "same polarity blocks" is sent out after coding of this invention, idle times occur in the output of the combiner 9. In these idle times, no information is written-in in the memory 10. When a significant block other than an idle block of the idle time occurs, the new significant block is written-in in the memory 10 after the immediately preceding significant block. Accordingly, the memory 10 stores only the significant blocks, so that only the significant blocks are sent out in the transmission line 121.

Figure 4:
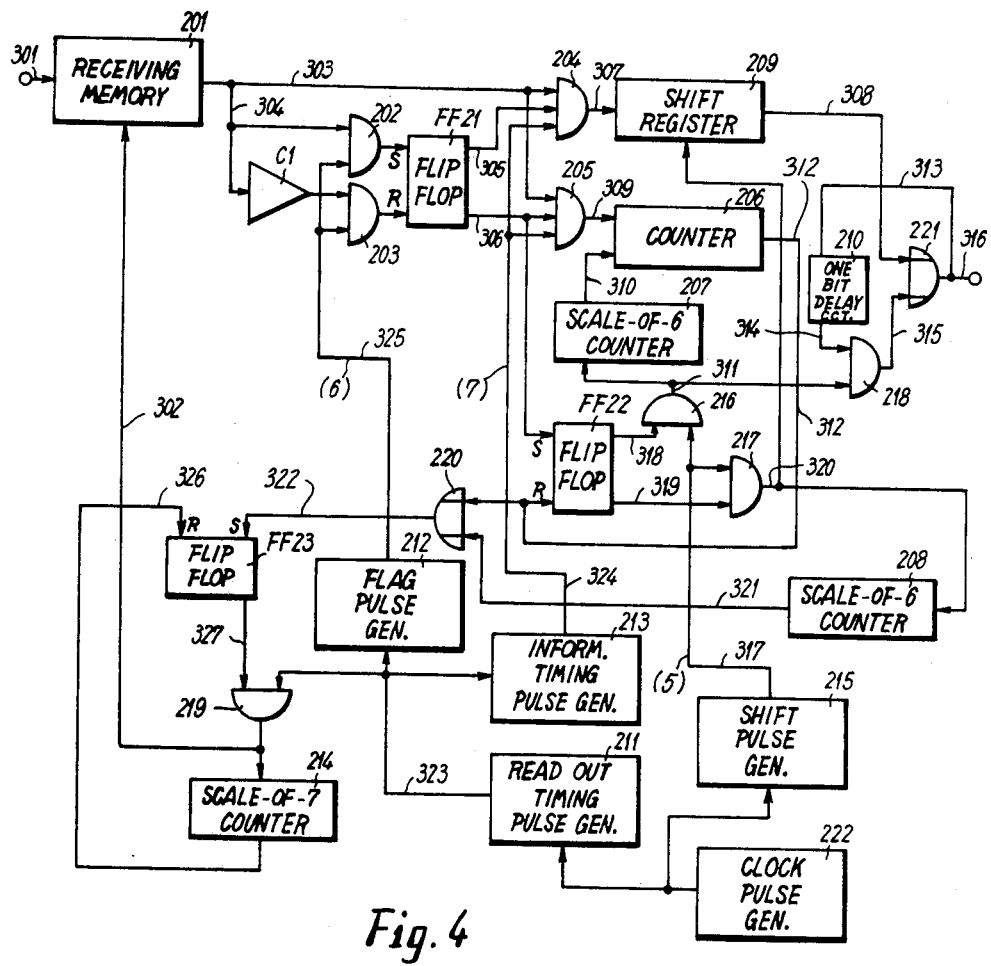
FIG. 4 is a block diagram illustrating an example of reconversion employed for reconverting the transmitted signal of this invention.

With reference to FIGS. 4 and 5, reverse signal conversion of the above converted signal will be described. An example shown in FIG. 4 comprises a receiving memory 201, AND circuits 202, 203, 204 and 205, a counter 206, scale-of-6 counters 207 and 208, a shift register 209, a one-bit delay circuit 210, a clock pulse generator 222, a readout timing pulse generator 211 for counting down the clock pulses to one sixth, a flag pulse generator 212 for generating a flag pulse 6 shown in FIG. 5 from readout timing pulses applied through a line 323, an information timing pulse generator 213 for generating information timing pulses 7 shown in FIG. 5 from the readout timing pulses applied through the line 323, a scale-of-7 counter 214, a shift pulse generator 215 for generating shift pulses 5 by counting down to one seventh the clock pulses from a line 222, AND circuits 216, 217, 218 and 219, OR circuits 220 and 221, flip flop circuits FF21, FF22 and FF23, and an inverter C1.

The receiving memory 201 temporarily stores an input signal train which is read out as one block of seven bits on the lines 303 and 304. A flag bit of the read out block from the line 304 is applied to the AND circuit 202 and, through the inverter C1, the AND circuit 203, in each of which the logical AND operation is performed on the flag pulse from the line 325. If the flag bit is the state "1," the flip flop circuit FF21 is set by the output of the AND circuit 202, while the flip flop circuit FF21 is reset by the output of the AND circuit 203 in a case where the flag bit is the state "0." In response to the setting of the flip flop circuit FF21, the read out block of the line 303 is stored in the shift register 209 through the AND circuit 204 which is opened at the occurrence of the information timing pulses 7 from the line 324. In response to the resetting of the flip flop circuit FF21, the read out block is temporarily stored in the counter 206 through the AND circuit 205, which is opened at the occurrence of the information timing pulses 7 from the line 324. Moreover, the flip flop circuit FF22 is set through a line 306 in response to the resetting of the flip flop circuit FF21, so that the AND circuit 216 is opened to pass the shift pulses 5 of a line 317 to a line 311. The shift pulses 5 obtained at the line 311 are applied to the AND circuit 218 together with the output of a line 314 of the one bit delay circuit 210, so that a pulse having the same polarity as the immediately preceding bit at an output line 316 is obtained at a line 315. The pulse of the line 315 is supplied to the line 316 through the OR circuit 221. The pulses of the line 311 are further applied to the scale-of-6 counter 207, so that a carry pulse is applied to the counter 206 for each six bits through a line 310. The counter 206 reduces the counting state thereof by one in response to each pulse from the line 310, so that a pulse is obtained at the line 312 when the counting state of the counter 206 reaches zero. The pulse from the counter 206 resets the flip flop circuit FF22 and is also applied to the OR circuit 220. In response to the resetting of the flip flop circuit FF22, the AND circuit 217 is opened so that the pulses 5 of the line 317 are obtained at a line 320. The shift pulses 5 obtained at the line 320 are applied to the scale-of-6 counter 208 and the shift register 209, so that the contents of the shift register 209 are sent out for one bit to the output line 316 through a line 308 and the OR circuit 221. The output pulse of the OR circuit 220 sets the flip flop circuit FF23 through a line 322, so that the AND circuit 219 is opened to apply the readout pulses to the scale-of-7 counter 214. A carry pulse of the scale-of-7 counter 214 resets the flip flop circuit FF23 through the line 326, so that seven bits of the read-out pulses are applied to the receiving memory 201 through a line 302. As a result of the above reverse signal conversion, the same signal train as the input binary signal 1 applied to the line 101 of FIG. 1 is obtained at the output line 316.

As has been described in the foregoing, the number of the same polarity blocks is counted and only its coded information is transmitted, in accordance with this invention, so that the necessary band-time integral is effectively compressed. Further, if the density of significant instants is relatively high and one or more significant instants are included in one block, the signal can be transmitted as it is within the preciseness of the sampling periods. Consequently, the above example of this invention has such an advantage that the required transmission bandwidth can be greatly compressed in comparison with any prior art systems.

In the above example of this invention, since the length of the block is fixed, bandwidth compression is not sufficient for signals in which the significant instant intervals are shorter than the total length of two blocks. This drawback can be effectively eliminated by another example of this invention as described below. Namely, another example of this invention is directed to a system in which a sampled binary signal obtained by sampling an input binary signal is divided into blocks, each corresponding to a certain number of bits; and the presence of polarity reversal in the signal block of the certain number of bits is examined at every application of the binary signal block. If polarity reversal is detected, the signal block of the certain number of bits is transmitted as it is, while if no polarity reversal is directed, a continous train of pulses of the same polarity are regarded as one unit signal and transmitted in a coded signal configuration. In short, this embodiment of this invention is a signal conversion system adapted to effect bandwidth compression by coding the number of bits regardless of the density of significant instants.

Figure 6:
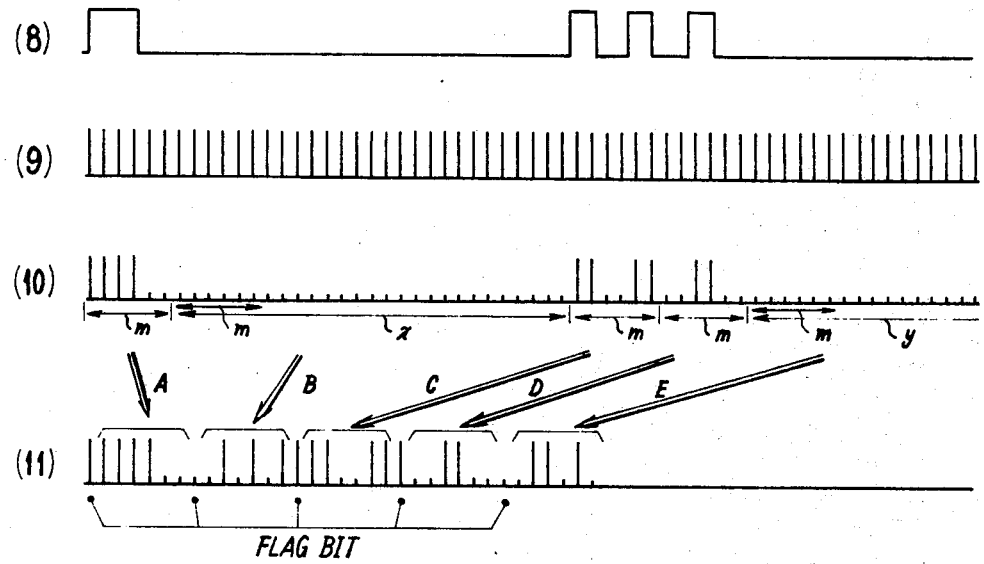
FIG. 6 illustrates time charts explanatory of the principle of another example of this invention.

FIG. 6 shows an example of pulse trains handled in this embodiment of this invention, in which a reference character 8 indicates an input binary pulse signal, 9 sampling pulses, 10 a sampled input pulse train obtained by sampling the input binary pulse signal 8 by the sampling pulses 9, and 11 a converted pulse signal of the signal 10 whose bandwidth is compressed as a signal to be transmitted. Since $m$ bits at the beginning of the sampled pulse train 10 include a significant instant, information of the $m$ bits is transmitted as information "A" and a flat bit "1" is added to the head of the information "A" so as to indicate that the associated $m$ bits are not coded. Namely, the flag bit "1" and the information "A" of the $m$ bits subsequent thereto become an output signal block. Since no polarity reversal is present in the subsequent $m$ bits, information "B" indicating the number of the subsequent $(x-m)$ bits is regarded as one unit signal lasting until next polarity reversal is added with a flag bit "0" indicating that the $(x-m)$ bits are coded. The next $m$ bits of the input signal pulse include polarity reversals, so that the flag bit "1" and information "C" composed of the uncoded $m$ bits of the input signal pulse 10 are transmitted as an output signal block. Thereafter similar conversion operations are repeated.

Figure 7:
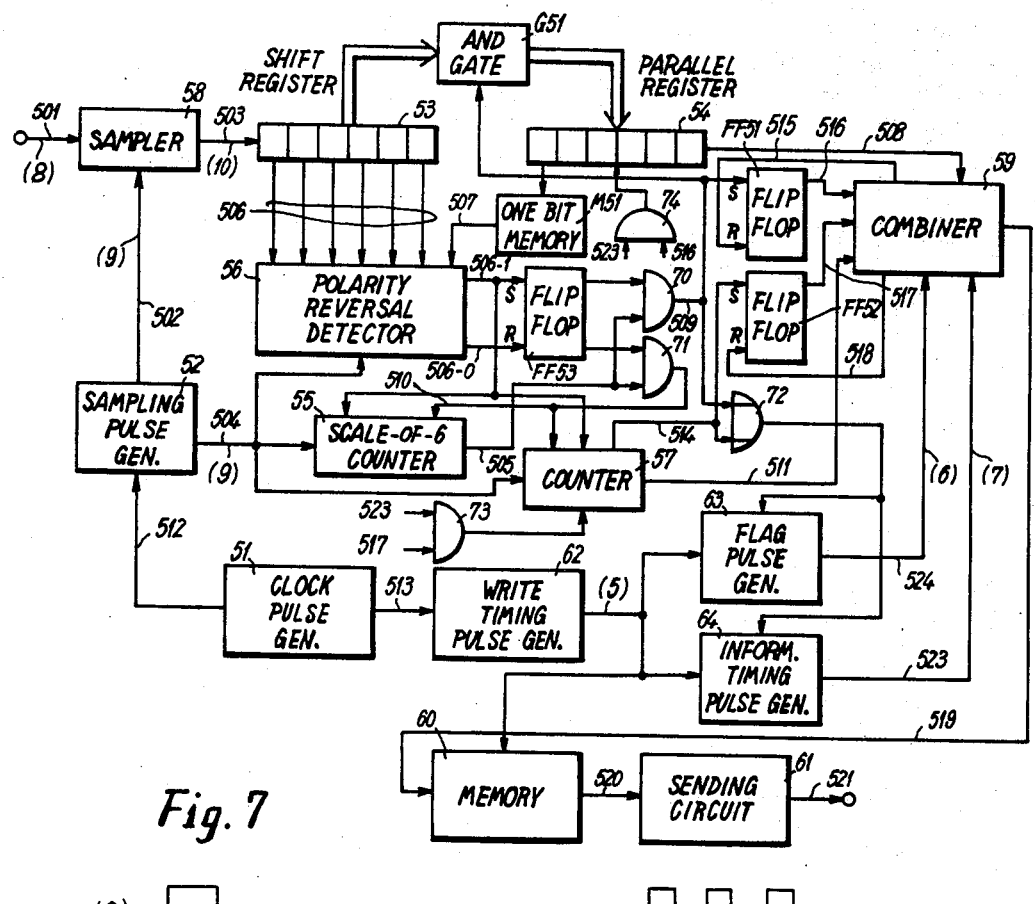
FIG. 7 is a block diagram illustrating another embodiment of this invention employed for performing the principle shown in FIG. 6.

FIG. 7 shows this embodiment of the present invention, which will be described for the case where $m = 6$ so as to facilitate a better understanding of this embodiment. A reference numeral 51 indicates a clock pulse generator; 52 a sampling pulse generator; 58 a sampler;

53 a shift register; 54 a parallel register; FF51, FF52 and FF53 flip flop circuits; G51 an AND gate; 55 a scale-of-6 counter for counting the number of sampling pulses; 56 a polarity reversal detector for detecting polarity reversal in the contents of the shift register 53;57 a counter; 59 a combiner for combining contents of the register 54 with these of the counter 57;60 a memory for storing therein ($m + 1$) bit of information derived from the combiner 59; 61 a sending circuit for transmitting information; 62 a write timing pulse generator; 63 a flag pulse generator; 64 an information timing pulse generator; 70, 71, 73 and 74 AND circuits; 72 an OR circuit; and M51 a one bit memory.

In the operation of the embodiment shown in FIG. 7, an input binary signal 8 applied through a line 501 is sampled at the sampler 58 by the sampling pulses 9 to produce the sampled input pulse train 10, which is applied to the shift register 53 through a line 503. The sampling pulses 9 are generated at the sampling pulse generator 52 by counting down clock pulses supplied through a line 512 to one seventh. Six bits in the shift registers 53 are compared by the polarity reversal detector 56 in polarity with the polarity of the stored bit of the one bit memory M51 at every one bit shift in the shift register 53. In this case, a pulse is obtained at a line 506-1 if any one of the compared six bits has different polarity from the stored bit of the one bit memory M51 as shown by the information "A," "C" or "D." However, a pulse is obtained at a line 506-0 if all the compared six bits have the same polarity as the stored bit of the one bit memory M51 as shown by the information "B." An example of the polarity reversal detector 56 is shown in FIG. 3A. The pulses of the line 506-1 sets the flip flop circuit FF53 and is applied to the scale-of-6 counter 55. The pulse of the line 506-0 resets the flip flop circuit FF53. In response to the pulse of the line 506-1, the scale-of-six counter 55 starts to counts the sampling pulses 9 from the line 504. In this case, if the counter 55 is counting the sampling pulses 9 when the pulse is applied through the line 506-1, the counter 55 continues the counting. Carry pulses of the scale-of-six counter 55 are applied to the AND circuits 70 and 71. In this case, if the flip flop circuit FF53 is set, the AND circuit 70 is opened so that pulses each indicative of a point of time between adjacent reversal polarity blocks of six bits including polarity reversal are obtained at a line 509. A pulse of the line 509 sets the flip flop circuit FF51 to the state "1" and openes the gate G51 to transfer the contents of the shift register 53 to the parallel register 54. A last one of the transferred six bits in the parallel register 54 is stored in the one bit memory M51. If the flip flop circuit FF53 is reset, the AND circuit 71 is opened so that pulses each indicative of a point of time between adjacent same polarity blocks of six bits are obtained at a line 510. A pulse of the line 510 is applied to the scale-of-six counter 55 to stop its counting operation and also to the counter 57 to start its counting operation. The counter 57 stops its counting operation in response to the pulse applied through the line 506-1 and then generates a pulse at a line 514 through a gate, which is provided in the counter 57 and opened except the state "0" of the counter 57. The pulse of the line 514 sets the flip flop circuit FF52. The carry pulses of the counter 57 are also applied to the line 514. The write timing pulse generator 62 counts down clock pulses supplied from a line 513 to one seventh to produce the write timing pulses 5. When any of the pulses of the lines 509 and 514 are applied through the OR circuit 72 to the pulse generators 63 and 64, the flag pulse generator 63 generates a pulse W1 of the flag pulse 6 to the line 524, while the information timing pulse generator 64 generates pulses W2 to W7 of the information timing pulses 7 to the line 523. The combiner 9 monitors the flip flop circuits FF51 and FF52. If the flip flop circuit FF51 is set to the state "1," the flag pulse is transferred from the flag pulse generator 63 to the memory 60 through the combiner 59, while the contents of the parallel register 54 are transferred at the occurrence of the information timing pulses 7 to the memory 60 through the combiner 59. The contents of the parallel register 54 are shifted in a parallel signal format by pulses supplied from the AND circuit 74, which is controlled by pulses of lines 516 and 523. If the flip flop circuit FF52 is set, the contents of the counter 57 are transferred to the memory through the combiner 59 at the occurrence of the information timing pulses 7. The contents of the counter 57 are read out by pulses supplied from the AND circuit 73, which is controlled by pulses from lines 517 and 523. In this case, a flag bit "0" is stored in the memory 60 at the occurrence of the flag pulse 6. In response to completion of storing in the memory 60, the flip flop circuits FF51 and FF52 are reset by pulses supplied through lines 515 and 518 respectively. An example of the combiner 9 is shown in FIG. 3B. The contents of the memory 60 are read out at the occurrence of the write timing pulses 5 from the pulse generator 62 and sent out to an output line 521 through a line 520 and the sending circuit 61.

As mentioned above, this example operates so that polarity reversal blocks including at least one significant instant are transmitted without coding while a same polarity bit train of $x$ bits more than $m$ bits is transmitted by coding the number or ($x - m$) bits. Accordingly, only significant information having the least redundancy is transmitted, so that the band-time integral for the transmitted signal of this example is effectively compressed. The transmitted signal of this example can be reconverted by a reconversion device, which is different from the example shown in FIG. 4 at the following points. One is elimination of the scale-of-six counter 207 to directly apply the output of the AND circuit 216 to the counter 206. The other is the initial setting of the counter 206 to a value which is equal to six plus the information received from the receiving memory 201. This initial setting of the counter 206 compensates a shortage of six bits, which is caused by the counter 57 counting from the seventh bits of the same polarity bit train. Other circuit structure is the same as the embodiment shown in FIG. 4.

In the above description, the signal length transmitted in the non-coded form and that transmitted in the coded form are of the same bit number. However, these signal lengths can be distinguished by the flag bit from each other, so that they need not always be equal to each other. Further, with the addition of a bit distinguishing the length of a coded signal, it is not always necessary to select the signal length to be constant. Moreover, although the foregoing description has been given in connection with the example in which the bnadwidth is compressed for the case of a one input signal system, it is possible to make efficient use of a transmission channel by inserting another signal system corresponding to the compressed bandwidth to assign a plurality of inputs to one transmission channel described with reference to the former example.

As has been described in the foregoing, according to the latter example of the present invention, those binary signal trains having a relatively long interval between polarity reversal instants between which the same polarity continues for more than $m$'s bits, are transmitted with the length of along interval being coded, and those binary signal trains having at least one short interval of between porality reversal instants are transmitted as they are without coding, so that the bandwidth is compressed with respect to the product of bandwidth and time independently of the density of polarity reversal instants. This signal conversion system is of particular utility when used with a signal in which a white part of long duration and a black part of relatively short duration alternately appear, such as a facsimile signal.

What we claim is:

1. A signal compression system, comprising:

sampling means for sampling at successive constant intervals a binary digital input signal to obtain a sampled binary pulse signal;

first temporary storage means connected to said sampling means for successively storing therein a predetermined number of bits of the sampled binary pulse signal which constitute a block of bits;

bit change detecting means connected to said first temporary storage means for producing either a non-detecting output signal or a detection output signal when no bit is detected or when any bit change is detected, respectively, by comparing each of the bits in a block of bits stored in the first temporary storage means with the last bit of a block of bits immediately preceding in time the block of bits stored in said first temporary storage means;

second temporary storage means connected to said first temporary storage means and said bit change detecting means for storing therein in response to said detection output signal, in a parallel signal configuration, the bits which are stored in said first temporary storage means and transferred to this second temporary storage means at intervals of said predetermined number of bits;

coding means connected to said bit change detecting means for coding only the duration of the bits in which no bit change is detected as represented by said non-detecting output signal and for developing a coded pulse signal representative of the detected duration; and signal interlacing means connected to said temporary storage means and said coding means for interlacing said coded pulse signal, or the contents of said second temporary storage means when it contains a blocks of bits having a bit change, with at least one sign bit discriminating them from each other to produce a converted output, so that said coded pulse signal is included in the compressed output in response to said non-detection output signal of said bit change detecting means.

2. A signal compression system according to claim 1, in which said coding means comprises a counter for counting the number of bit blocks, each corresponding to said predetermined number of bits of the binary pulse signal, and wherein said bit change detecting means develops said non-detection signal or said detection output signal for said predetermined number of bits.

3. A signal compression system according to claim 1, in which said coding means comprises a counter for counting the number of bits in response to said non-detection ouput signal, and wherein bit change detecting means develops said non-detection output signal or said detection output signal for said predetermined number of bits before said bit change is detected and for each bit after said bit change is detected.

* * * * *